United States Patent [19]

Warner

[11] 4,092,035
[45] May 30, 1978

[54] DEVICE TO PREVENT BINDING OF A SWIVEL COUPLING IN A TRAILER HITCH ARRAY

[76] Inventor: Richard E. Warner, 1530 Edgewood Dr., Lodi, Calif. 95240

[21] Appl. No.: 790,848

[22] Filed: Apr. 25, 1977

[51] Int. Cl.² .............................................. B60D 1/12
[52] U.S. Cl. .................................. 280/446 R; 280/432
[58] Field of Search .............. 280/446 R, 456 R, 457, 280/460 R, 405 R, 406 A, 511, 446 B, 432

[56] References Cited

U.S. PATENT DOCUMENTS

| 3,677,564 | 7/1972 | Kothmann | 280/457 |
| 3,912,300 | 10/1975 | Bryan | 280/400 |

Primary Examiner—Joseph F. Peters, Jr.
Assistant Examiner—R. Schrecengost
Attorney, Agent, or Firm—Roger B. Webster

[57] ABSTRACT

A device to prevent binding of the swivel coupling in a trailer hitch array which includes a draft hitch projecting forwardly from the trailer, the swivel coupling being of longitudinal pintle type and projecting rearwardly from the towing vehicle, a mount to which the rear end of the swivel coupling is fixed, and a ball and socket unit connected between the forward end of the draft hitch and the mount; said device being comprised of a yoke connected between the draft hitch and the mount independently of the ball and socket unit, effective to always maintain the relatively rotatable socket centralized on the ball whereby to prevent binding and inoperativeness of such swivel coupling which otherwise frequently occurs in response to lateral cocking of said socket on the ball caused by forces transmitted from the trailer to the draft hitch under certain travel conditions. The device is especially adapted, but not limited, for use in a hitch array in which the draft hitch is of load-leveling type.

10 Claims, 4 Drawing Figures

DEVICE TO PREVENT BINDING OF A SWIVEL COUPLING IN A TRAILER HITCH ARRAY

BACKGROUND OF THE INVENTION

1. FIELD OF THE INVENTION

In a trailer hitch array, as disclosed and wherein a ball and socket unit and a longitudinal pintle type swivel coupling are included in tandem with the swivel coupling disposed between the ball and socket unit and the towing vehicle, certain forces—as when the trailer and the towing vehicle are in angular relation and particularly when the trailer relatively tilts laterally—are imposed through the draft hitch on the ball and socket unit and tend to cock the socket on the ball to an extent that such forces transmit forwardly to, and cause binding of, the swivel coupling. Upon such an occurrence, the relative lateral tilt of the trailer causes an undesirable response in the towing vehicle, resulting in difficulty of steering control and sometimes causing an accident. The present invention was conceived by me in a successful effort to provide a device which effectively prevents the above discussed problem.

THE PRIOR ART

U.S. Pat. Nos. 1,401,873; 2,435,383; 2,515,856; 2,940,776; 3,306,628; 3,325,187; 3,380,757; 3,490,789; 3,552,771; 3,552,775; 3,884,055 and 3,920,266 represent the prior art to the extent known to applicant, and applicant has no knowledge of any prior art disclosing the particular structure of the herein-claimed device.

SUMMARY OF THE INVENTION

The present invention provides, as a major object, a novel device to prevent undesirable binding of a swivel coupling in a trailer hitch array which includes such coupling, and wherein such binding otherwise may occur in response to certain forces created during travel and transmitted from the trailer—through the hitch array —to said swivel coupling.

The present invention provides, as an additional important object, a device, as above, particularly adapted for inclusion in a hitch array which includes a draft hitch projecting forwardly from the trailer, the swivel coupling being of longitudinal pintle type and projecting rearwardly from the towing vehicle, a mount to which the rear end of the swivel coupling is fixed, and a ball and socket unit connected between the forward end of the draft hitch and the mount; said device being comprised of means, connected between the draft hitch and the mount independently of the ball and socket unit, effective to always maintain the relatively rotatable socket centralized on the ball whereby to prevent binding and inoperativeness, of such swivel coupling, which otherwise occurs in response to lateral cocking of said socket on the ball caused by forces transmitted from the trailer to the draft hitch under certain travel conditions. The device is especially adapted, but not limited, for use in a hitch array in which the draft hitch is of load-leveling type.

The present invention provides, as a further object, a device, for the purpose described, which is designed for ease and economy of manufacture, and convenience of installation.

The present invention provides, as a still further object, a practical, reliable, and durable device, for the purpose described, and one which is exceedingly effective for the purpose for which it is designed.

DESCRIPTION OF THE PREFERRED EMBODIMENT

Figure 1:
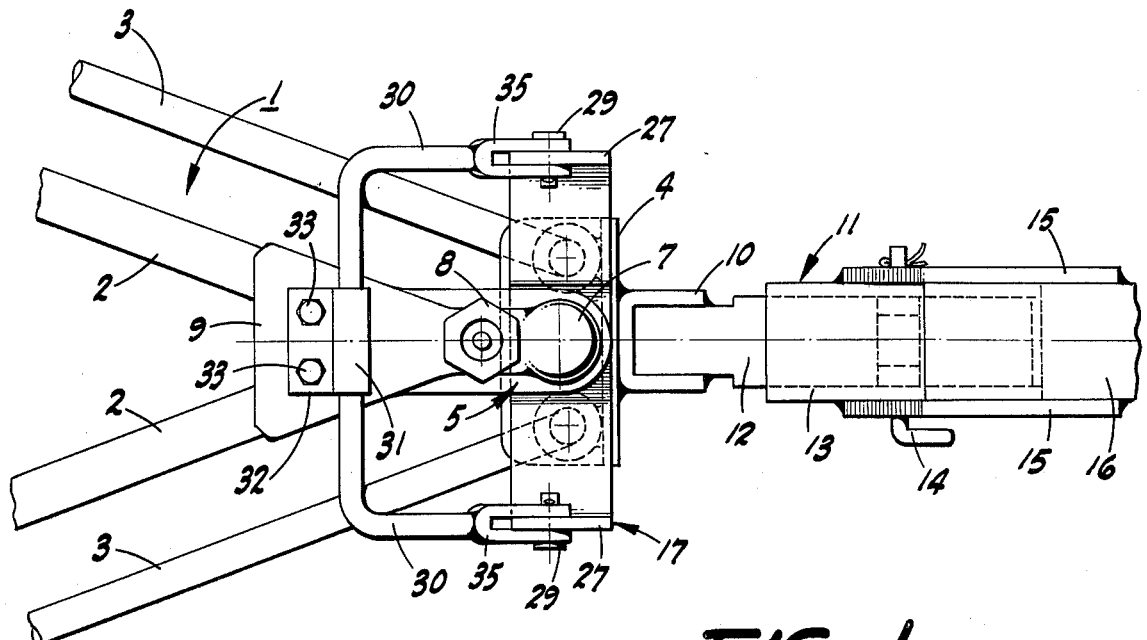
FIG. 1 is a top plan view of a trailer hitch array embodying the device of the present invention.
Figure 2:
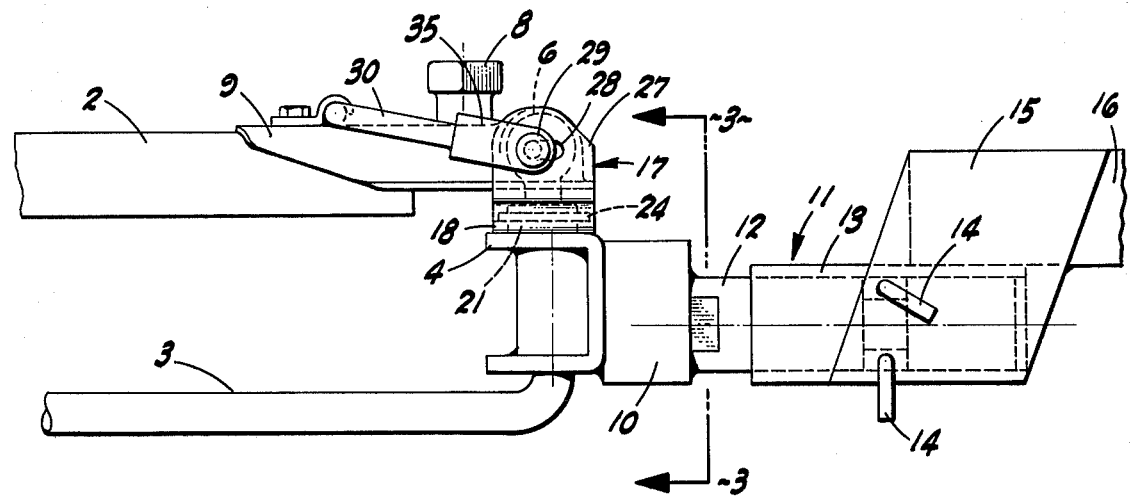
FIG. 2 is a side elevation of the same.
Figure 3:
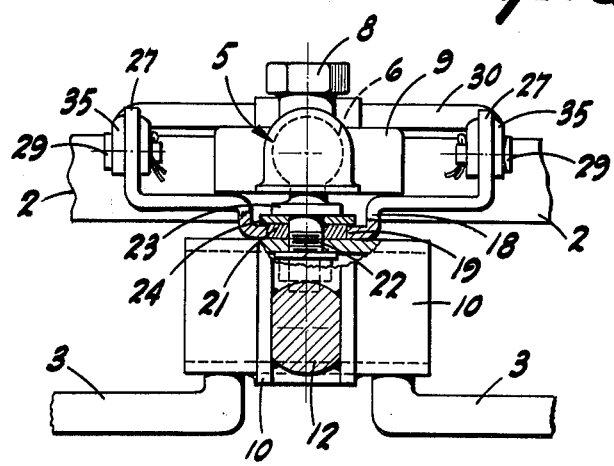
FIG. 3 is a transverse sectional elevation taken substantially on line 3—3 of FIG. 2.
Figure 4:
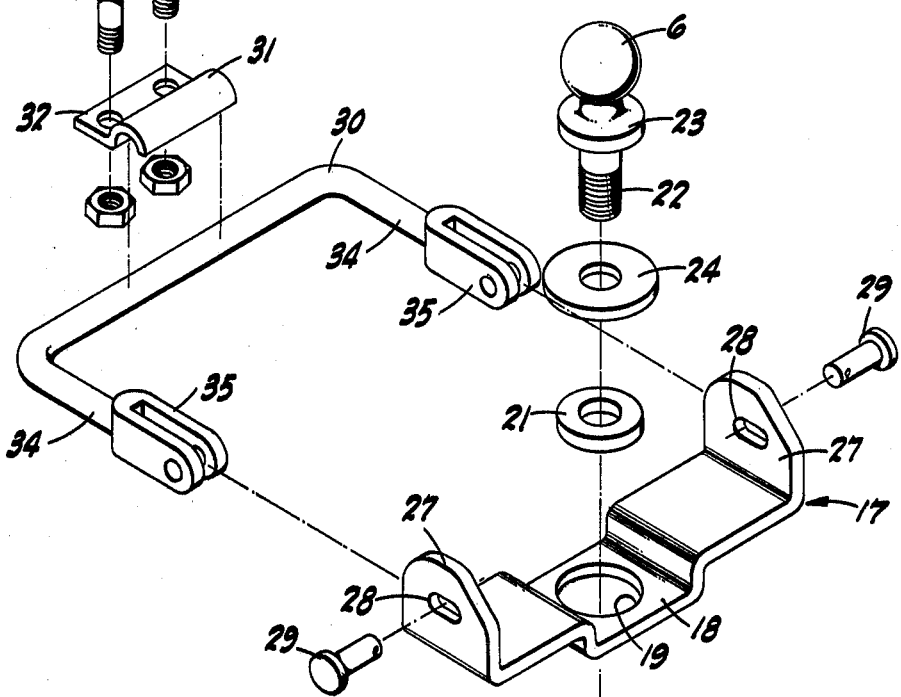
FIG. 4 is an exploded view showing the parts of the device, together with the ball of the ball and socket unit, and related parts including the ball mount.
Figure 4:
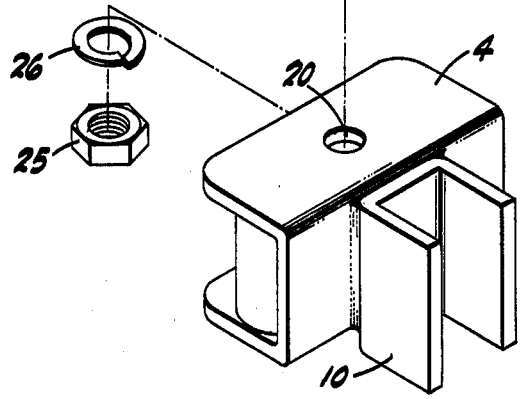

Referring now more particularly to the drawings and to the characters of reference marked thereon, the device of the present invention is employed in conjunction with a trailer hitch array which—conventionally—embodies the following:

A V-shaped draft hitch, indicated generally at 1, is mounted on and projects forwardly from the trailer (not shown); such draft hitch 1, which includes forwardly converging hitch bars 2, is preferably of well-known load-leveling type having spring rods 3 extending in parallelism below and laterally outwardly of the bars 2, and which rods 3 upturn and connect at their forward ends to a ball mount 4.

A ball and socket unit, indicated generally at 5, connects the forward end of draft hitch 1 with the ball mount 4; such unit including a ball 6 secured to and upstanding from said mount.

The ball and socket unit 5 includes a downwardly opening socket 7 which embraces the ball 6 in normally centralized, relatively rotatable relation in a substantially horizontal plane; the socket being releasably held against escape from the ball by usual means including a hand nut 8.

The socket 7 is formed with a rearwardly extending attachment plate 9 which secures the socket to the forward end of the draft hitch 1; such plate overlying, in upwardly facing relation, and being suitably fixed to said forward end of the draft hitch. The ball and socket unit 5, as above, provides a detachable connection between the draft hitch 1 and the ball mount 4.

The mount 4 is formed, at the front, with a U-shaped, forwardly opening bracket 10 to which is attached the rearward end of a swivel coupling indicated generally at 11. The swivel coupling 11 includes a longitudinal pintle 12 fixed at its rearward end in the bracket 10 and rotatably engaged ahead thereof in a socket 13; the pintle 12 being releasably retained in the socket 13 by removable lock pins 14. The swivel coupling 11 is essentially of the same construction disclosed in my U.S. Pat. No. 3,552,775, dated Jan. 5th, 1971, on TRAILER HITCH COUPLING.

At the forward portion thereof, the swivel coupling 11 is rigidly secured—by plates 15—to a drawbar 16 fixed on and projecting rearwardly from the towing vehicle (not shown).

In normal operation of the above-described hitch array, the ball and socket unit 5 permits the towing vehicle and the trailer to freely assume an angular relation as when traversing a curve, while during straight-away travel the swivel coupling 11 allows the towing vehicle or the trailer to assume positions of relative lateral tilt without affecting the other. However, under certain travel conditions, especially when the towing vehicle and the trailer are in angular relation, the socket cocks laterally on the ball 6 to an extent that forces are transmitted to, and bind the swivel coupling—all as hereinbefore described.

To avoid the occurrence of such undesirable result, I provide—in the described hitch array—the device of the present invention and which comprises the following:

A relatively narrow, elongated cross plate 17 extends transversely across the ball mount 4 and is formed with a downwardly offset central section 18 which seats on said ball mount; such central section 18 having a relatively large diameter, circular bore 19 therethrough, and which bore is concentric with a central hole 20 in the top of the ball mount.

A washer 21 is engaged in matching relation in the bore 19, and such washer 21 is slightly thicker axially than the central section 18 of cross plate 17. The threaded, depending neck 22 of the ball 6 extends below an integral stop collar 23, passes through an enlarged washer 24, and thence passes through said washer 21 and the central hole 20 in the top of the ball mount 4. Below said top of the ball mount, a nut 25 and lock washer 26 are carried on the threaded neck 22, and secure the ball 6 on the ball mount 4. With the nut 25 tightened to hold ball 6 in a fixed position, stop collar 23 is drawn tightly against washer 24, and the latter bears not on the central section 18 but rather on the slightly thicker washer 21 seated on top of the ball mount 4. Consequently, said central section 18 and, of course, the entire cross plate 17 is not bound and is free to turn about the ball neck 22 as an axis for the purpose as will hereinlater appear. While free to turn, the cross plate 17 is held between washer 24 and the top of the ball mount 4 sufficiently closely to prevent rocking of said cross plate in a transverse vertical plane.

At its ends, and which are disposed laterally outwardly of the ball mount 4, the cross plate is formed with upturned ears 27 each having an elongated, longitudinal slot 28 therein. Removable, cotter-locked pins 29 extend through the slots 28.

A substantially horizontal, forwardly opening, U-shaped yoke 30 is disposed mainly to the rear of the ball in symmetrical relation thereto, and such yoke spans at the rear over the socket attaching plate 9 and is rigidly secured thereto by a semi-circular hold-down clip 31 having a flange 32 bolted, as at 33, to such plate 9.

The yoke 30 includes forwardly projecting side arms 34 each provided at the forward end with a clevis 35 which embraces the corresponding upstanding ear 27 of the cross plate 17; each clevis being normally (but detachably) secured to the related ear by one of the pins 29. Because of the elongation of the slots 28, slight longitudinal loose play desirably exists between each clevis and the corresponding ear; this to allow of some variance, in horizontal planes, of the trailer and the towing vehicle.

With the above-described device, of the present invention, secured on the hitch array in the manner described, it will be understood that the socket 7 is maintained at all times in its normal position centered on the ball 6; the socket being prevented from laterally cocking on the ball (with the resultant undesirable binding of the swivel coupling as previously described) by reason of the interconnected yoke 30 and cross plate 17 holding the draft hitch 1 and the ball mount 4 against any relative lateral tilting.

The ball and socket unit 5 otherwise functions normally; the cross plate 17 turning about the axis of the ball as the ball and socket relatively rotate when the trailer and the towing vehicle assume an angular relation.

When it is desired to uncouple the ball and socket unit 5, the pins 29 are first pulled in order to permit the necessary separation of the yoke 30 from the cross plate 17.

From the foregoing description, it will be readily seen that there has been produced such a device, for the purpose described, as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

I claim:

1. A device to prevent binding of the swivel coupling in a trailer hitch array which includes a draft hitch adapted to project forwardly from a trailer, the swivel coupling being of longitudinal pintle type and adapted to project rearwardly from a towing vehicle, a mount to which the rear end of the swivel coupling is fixed, and a ball and socket unit connected between the forward end of the draft hitch and the mount, the ball being fixed on and upstanding from the mount and the socket being fixed on the draft hitch; said device being characterized by the inclusion of instrumentalities, connected between the draft hitch and the mount, operative to maintain the socket centralized on the ball and against lateral cocking thereon, yet without restricting relative rotation between the socket and ball about the perpendicular axis of said ball; said instrumentalities comprising one member, first means rigidly fixing said one member on the draft hitch adjacent the ball and socket unit, another member, second means securing said other member on the mount for rotation about such axis but restraining said other member against lateral tilting relative to the mount and the ball thereon, and third means connecting said members so that said one member restrains said other member against lateral tilting relative to the draft hitch.

2. A device, as in claim 1, in which said one member is a yoke fixed on the draft frame and including transversely spaced, forwardly projecting arms, the ball and socket unit being disposed between such arms; said other member being a rotatable cross plate, and said third means connecting the forward ends of the yoke arms to corresponding outer ends of the cross plate.

3. A device, as in claim 2, in which the cross plate includes upstanding ears at the outer ends of said cross plate; said third means being a clevis, on each arm of the yoke, embracing the related ear of the cross plate, and transverse axis pins connecting each clevis and the ear engaged thereby.

4. A device, as in claim 3, in which the pins are removable to permit separation of the clevises from the ears preparatory to detachment of the socket from the ball.

5. A device, as in claim 1, in which said one member is a U-shaped yoke fixed on the draft frame and opening forwardly in straddling relation to the ball and socket unit; the ball including a depending neck secured to the mount, and said other member being a cross plate centrally rotatable about said neck, the ball neck having an integral stop collar thereon, the cross plate being confined between the top of the mount and said stop collar, and ears upstanding from the outer ends of said cross plate; said third means connecting the forward ends of the yoke to corresponding ears of the cross plate.

6. A device, as in claim 5, in which said third means includes a clevis on each forward end of the yoke, with each clevis embracing and pivotally connected to the related ear.

7. A device, as in claim 1, in which said one member is a U-shaped yoke fixed on the draft frame and opening forwardly in straddling relation to the ball and socket unit, said yoke including transversely spaced, forwardly projecting arms; and said other member is a rotatable cross plate having upstanding ears at the outer ends thereof, and transverse axis pivots connecting the forward ends of the yoke arms to related ears of the cross plate.

8. A device, as in claim 1, in which the ball includes a depending neck secured to the mount, and said other member is a cross plate centrally rotatable about said neck; the cross plate having a central bore therein, and said second means comprising a washer engaged in the bore, the washer being of slightly greater thickness than the portion of the cross plate surrounding such bore, the depending neck of the ball extending through said washer, another washer on said neck, such other washer bearing on top of said first-named washer and of a diameter to closely overhang said portion of the cross plate, and an integral stop collar on said neck bearing on such other washer, all whereby the cross plate is rotatable about said neck but is restrained against lateral tilting relative to the mount.

9. A device, as in claim 1, in which said third means includes laterally spaced, transverse axis pivots connecting said members.

10. In a trailer hitch array which includes a draft hitch adapted to project forwardly from a trailer, a mount, and a ball and socket unit connected between the forward end of the draft hitch and the mount, the ball being fixed on and upstanding from the mount and the socket being fixed on the draft hitch; said device being characterized by the inclusion of instrumentalities, connected between the draft hitch and the mount, operative to maintain the socket centralized on the ball and against lateral cocking thereon, yet without restricting relative rotation between the socket and ball about the perpendicular axis of said ball; said instrumentalities comprising one member fixed on the draft hitch adjacent the ball and socket unit, another member, means securing said other member on the mount for rotation about such axis but restrained against lateral tilting relative to the mount and the ball thereon, and means connecting said members whereby said one member restrains the other member against lateral tilting relative to the draft hitch.

* * * * *